US012555029B2

United States Patent
Vu et al.

(10) Patent No.: US 12,555,029 B2
(45) Date of Patent: Feb. 17, 2026

(54) PIPELINE RANKING WITH MODEL-BASED DYNAMIC DATA ALLOCATION

(71) Applicant: International Business Machines Corporation, Armonk, NY (US)

(72) Inventors: Long Vu, Chappaqua, NY (US); Saket Sathe, Mohegan Lake, NY (US); Bei Chen, Blanchardstown (IE); Peter Daniel Kirchner, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 1071 days.

(21) Appl. No.: 17/237,379

(22) Filed: Apr. 22, 2021

(65) Prior Publication Data

US 2022/0343207 A1 Oct. 27, 2022

(51) Int. Cl.
*G06N 20/00* (2019.01)
*G06F 11/30* (2006.01)
*G06F 11/34* (2006.01)
*G06N 5/04* (2023.01)

(52) U.S. Cl.
CPC ......... *G06N 20/00* (2019.01); *G06F 11/3006* (2013.01); *G06F 11/3447* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 10,217,061 B2 | 2/2019 | Hayes et al. | |
| 10,417,577 B2 | 9/2019 | Bowers | |
| 2016/0179063 A1* | 6/2016 | De Baynast De Septfontaines .... | H04L 41/0853 700/11 |
| 2019/0018866 A1* | 1/2019 | Ormont .................... | G06N 5/01 |
| 2019/0034798 A1 | 1/2019 | Yu | |
| 2019/0205838 A1* | 7/2019 | Fang ................ | G06Q 10/06398 |
| 2019/0303795 A1 | 10/2019 | Khiari | |
| 2019/0317805 A1 | 10/2019 | Metsch | |
| 2019/0377984 A1* | 12/2019 | Ghanta ............... | G06F 18/2155 |

(Continued)

FOREIGN PATENT DOCUMENTS

EP 3475884 A1 5/2019

OTHER PUBLICATIONS

Meta-Learning: A Survey Vanschoren et. al https://arxiv.org/pdf/1810.03548.pdf (Year: 2018).*

(Continued)

*Primary Examiner* — Mandrita Brahmachari
(74) *Attorney, Agent, or Firm* — Gavin Giraud

(57) ABSTRACT

In a method for ranking machine learning (ML) pipelines for a dataset, a processor receives first performance curves predicted by a meta learner model for a plurality of ML pipelines. A processor allocates a first subset of data points from the dataset to each of the plurality of ML pipelines. A processor receives first performance scores for each of the ML pipelines for the first subset of data points. A processor updates the meta learner model using the first performance scores. A processor receives second performance curves from the meta learner model updated with the first performance scores. A processor ranks the plurality of ML pipelines based on the second performance curves.

18 Claims, 5 Drawing Sheets

(56) References Cited

U.S. PATENT DOCUMENTS

| | | | |
|---|---|---|---|
| 2020/0019888 A1 | 1/2020 | Mccourt | |
| 2020/0105001 A1* | 4/2020 | Rotenstein | G06F 18/2148 |
| 2020/0140925 A1 | 5/2020 | Chow | |
| 2020/0272909 A1* | 8/2020 | Parmentier | G06N 3/126 |
| 2021/0097444 A1* | 4/2021 | Bansal | G06F 9/546 |
| 2022/0036246 A1* | 2/2022 | Chen | G06N 5/022 |
| 2022/0044078 A1* | 2/2022 | Sathe | G06N 20/00 |
| 2022/0051049 A1* | 2/2022 | Wang | G06N 20/10 |
| 2022/0076144 A1* | 3/2022 | Ram | G06F 18/24323 |
| 2022/0198222 A1* | 6/2022 | Rawat | G06F 8/4452 |
| 2022/0292304 A1* | 9/2022 | Suzani | G06N 3/0455 |
| 2023/0344432 A1 | 10/2023 | Yasuda et al. | |

OTHER PUBLICATIONS

Performance Evaluation Metrics for Cloud, Fog and Edge Computing: A Review, Taxonomy, Benchmarks and Standards for Future Research Mohammed et. al. (Year: 2020).*

Binnig et al., "Towards Interactive Curation & Automatic Tuning of ML Pipelines", DEEM'18: Proceedings of the Second Workshop on Data Management for End-To-End Machine Learning, Houston, Texas, USA, Jun. 2018, 3 pages, <https://mlsys.org/Conferences/doc/2018/118.pdf>.

Chandrashekaran et al. "Speeding Up Hyper-Parameter Optimization By Extrapolation of Learning Curves Using Previous Builds", Proceedings of the Joint European Conference on Machine Learning and Knowledge Discovery in Databases, Skopje, Macedonia, Sep. 18-22, 2017, pp. 477-492, <http://akshayc.com/publications/ecml2017_gelc_submitted.pdf>.

Feurer et al., "Efficient and Robust Automated Machine Learning", Proceedings of the Neural Information Processing Systems (NIPS) Conference, Dec. 7-10, 2015, Montreal, Canada, 9 pages, <https://ml.informatik.uni-freiburg.de/papers/15-NIPS-auto-sklearn-preprint.pdf>.

Kohavi et al., "Automatic Parameter Selection By Minimizing Estimated Error", Proceedings of the Twelfth International Conference on Machine Learning, Tahoe City, California, Jul. 9-12, 1995, pp. 304-312, <https://www.sciencedirect.com/science/article/pii/B9781558603776500451>. {Abstract Information Only}.

Laadan et al., "RankML: Meta Learning-Based Approach for Pre-Ranking Machine Learning Pipelines", arXiv Cornell University, Nov. 20, 2019, 9 pages, <https://arxiv.org/pdf/1911.00108.pdf>.

Olson et al., "TPOT: A Tree-based Pipeline Optimization Tool for Automating Machine Learning", Proceedings of the 2016 JMLR: Workshop and Conference, 2016, Monte Carlo, 9 pages.

Provost et al., "Efficient Progressive Sampling", Proceedings of the Fifth ACM SIGKDD International Conference on Knowledge Discovery and Data Mining, Aug. 1999, pp. 23-32, <https://dl.acm.org/doi/abs/10.1145/312129.312188>.

Sabharwal et al. "Selecting Near-Optimal Learners Via Incremental Data Allocation", Proceedings of the Thirtieth AAAI Conference on Artificial Intelligence (AAAI-16), Feb. 12-17, 2016, Phoenix, Arizona, 9 pages, <https://www.aaai.org/ocs/index.php/AAAI/AAAI16/paper/download/12524/11835>.

Swersky et al., "Freeze-thaw Bayesian Optimization", arXiv, Cornell University, Jun. 16, 2014, 12 pages, <https://arxiv.org/abs/1406.3896>.

Crotty et al., "Vizdom: interactive analytics through pen and touch", Proceedings of the VLDB Endowment 8, 12 (2015), pp. 2024-2027.

Fisher et al., "Interactions with big data analytics", Interactions 19, 3 (2012), pp. 50-59.

Klein et al., "Fast bayesian optimization of machine learning hyperparameters on large datasets", Retrieved from: arXiv preprint arXiv:1605.07079, 2017, 9 pages.

Li et al., "Hyperband: A novel bandit-based approach to hyperparameter optimization", Retrieved from: arXiv prepri arXiv:1603.06560, 2018, pp. 1-52.

Unknown, "Competitions", Retrieved from: https://web.archive.org/web/20191231040542/https://www.kaggle.com.competitions, Retrieved from: Dec. 31, 2019, 4 pages.

Unknown, "OpenML, Machine learning, better, together", Retrieved from: https://web.archive.org/web/20181208043446/https://www.openml.org/, Retrieved on Jan. 17, 2019, 7 pages.

Zhao et al., "Controlling false discoveries during interactive data exploration", In Proceedings of the 2017 ACM International Conference on Management of Data. ACM, pp. 527-540.

* cited by examiner

PIPELINE RANKING WITH MODEL-BASED DYNAMIC DATA ALLOCATION

BACKGROUND

The present invention relates generally to the field of pipeline selection in machine learning, and more particularly to automatically selecting an optimal pipeline, or ranking multiple pipelines, for a given dataset.

In machine learning (ML), pipelines are consolidated processes that can be used in a broad range of applications: from simple data pipelines to complex machine learning pipelines. ML pipelines streamline data analytics and machine learning by automating the machine learning workflow. Specifically, pipelines enable data to be transformed and correlated into a model that can then be analyzed to achieve outputs. ML pipelines include segmentation of ML workflows into transformers that can then be pipelined together to feed data to estimators. The transformers may be independent, reusable, modular parts that ingest, clean, preprocess, or provide other filtering of an input dataset so that the estimator of the pipeline may consistently model data from a variety of data sources, even if the data sources collect data under differing criteria.

SUMMARY

Aspects of an embodiment of the present invention disclose a method, computer program product, and computing system for ranking machine learning pipelines. A processor receives first performance curves predicted by a meta learner model for a plurality of ML pipelines. A processor allocates a first subset of data points from the dataset to each of the plurality of ML pipelines. A processor receives first performance scores for each of the ML pipelines for the first subset of data points. A processor updates the meta learner model using the first performance scores. A processor receives second performance curves from the meta learner model updated with the first performance scores. A processor ranks the plurality of ML pipelines based on the second performance curves.

DETAILED DESCRIPTION

The embodiments of the present invention disclosed herein produce a ranking of machine learning (ML) pipelines. ML pipelines are not universally accurate for all datasets, and certain types of data may be more accurately modeled by some pipelines over others. Determining the pipelines that will model a particular dataset with the highest level of performance on a performance metric is not obvious without testing aspects of the pipeline and the dataset. Testing involves modeling the dataset by running the data through the pipeline. Specifically, a pipeline may be evaluated by projecting using linear regression, where data is allocated in fixed stages. Embodiments disclosed herein recognize, however, that linear regression of every pipeline can be inefficient, no matter how few datapoints are allocated in each fixed stage. The embodiments disclosed herein, therefore, utilize "meta learner models" to increase efficiency by evaluating meta features and pipeline features to match specific types of pipelines to similar datasets that have previously been accurately modeled. The rankings of the pipelines provided by the meta learner models are updated with actual evaluation of the pipelines, and are thus regularly improved, rather than being trained just a single time before projecting the performance of pipelines.

Figure 1:
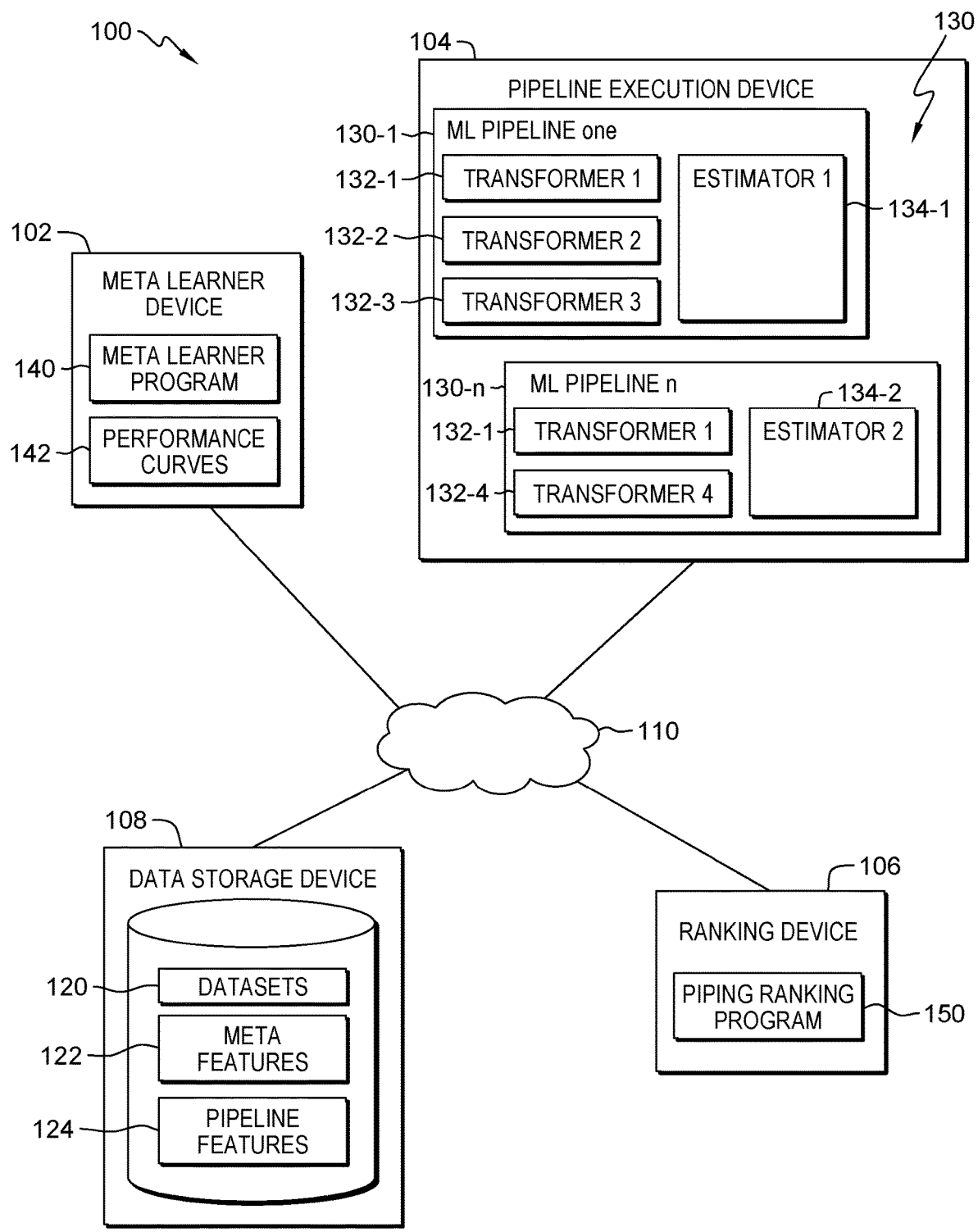
FIG. 1 is a functional block diagram illustrating a machine learning pipeline environment, in accordance with an embodiment of the present invention.

Turning now to the drawings, FIG. 1 depicts a functional block diagram illustrating a pipeline ranking environment 100, in accordance with one embodiment of the present invention. FIG. 1 provides only an illustration of one implementation and does not imply any limitations regarding the environments in which different embodiments may be implemented. Many modifications to the depicted environment may be made by those skilled in the art without departing from the scope of the invention as recited by the claims.

The pipeline ranking environment 100 includes a meta learner device 102, a pipeline execution device 104, a ranking device 106, and a data storage device 108 connected over a network 110. The network 110 can be, for example, a telecommunications network, a local area network (LAN), a wide area network (WAN), such as the Internet, or a combination of the three, and can include wired, wireless, or fiber optic connections. The network 110 can include one or more wired and/or wireless networks that are capable of receiving and transmitting data, voice, and/or video signals, including multimedia signals that include voice, data, and video information. In general, the network 110 can be any combination of connections and protocols that will support communications between the meta learner device 102, the pipeline execution device 104, the ranking device 106, and the data storage device 108, and other computing devices (not shown) within the pipeline ranking environment 100. In various embodiments, the network 110 operates locally via wired, wireless, or optical connections and can be any combination of connections and protocols (e.g., personal area network (PAN), near field communication (NFC), laser, infrared, ultrasonic, etc.).

The data storage device 108 can be a standalone computing device, a management server, a web server, a mobile computing device, or any other electronic device or computing system capable of receiving, sending, and processing data. In other embodiments, the data storage device 108 can represent a server computing system utilizing multiple computers as a server system, such as in a cloud computing environment. In another embodiment, the data storage device 108 can be a laptop computer, a tablet computer, a netbook computer, a personal computer (PC), a desktop computer, a personal digital assistant (PDA), a smart phone, or any programmable electronic device capable of communicating with other computing devices (not shown) within the pipeline ranking environment 100 via the network 110. In another embodiment, the data storage device 108 represents a computing system utilizing clustered computers and components (e.g., database server computers, application server computers, etc.) that act as a single pool of seamless resources when accessed within the pipeline ranking environment 100. In the depicted embodiment, the storage device 108 includes datasets 120, meta features 122, and pipeline features 124. In other embodiments, the data storage device 108 may contain other applications, databases, programs, etc. which have not been depicted in the pipeline ranking environment 100. The data storage device 108 may include internal and external hardware components.

The data storage device 108 is a repository for data used by any of the devices/programs within the pipeline ranking environment 100. In FIG. 1, the data storage device 108 is depicted as a separate device, but in other embodiments, the data storage device 108 may reside anywhere within the pipeline ranking environment 100 provided that the meta learner device 102, the pipeline execution device 104, and the ranking device 106, have access to the datasets 120, the meta features 122, and the pipeline features 124. The data storage device 108 can be implemented with any type of storage device capable of storing data and configuration files that can be accessed and utilized by the meta learner device 102, the pipeline execution device 104, the ranking device 106, such as a database server, a hard disk drive, or a flash memory.

The pipeline execution device 104 accesses the data storage device 108 to model data from the datasets 120 using the pipelines 130. The pipeline execution device 104 is illustrated having two pipelines 130: a first ML pipeline 130-1 and an nth ML pipeline 130-n. The pipeline execution device 104, however, may include any number of additional pipelines 130 for testing and determining which pipeline 130 models a dataset 120 with the highest accuracy. The pipelines 130 differ in two aspects: a type of estimator 134; and a number and type of transformers 132. The estimators 134 predict a value (or values) for a target outcome by using input data. For example, an estimator can be a classifier or a regressor that classifies entries from the datasets 120 based on attributes. The transformers 132 are modular components that transform the input data in some way. Transforming may include changing the number of rows or columns, changing data values in the rows or columns, or processing the data in the datasets 120 in modular chunks before the estimators 134 perform classification. For example, some transformers 132 may remove blank entries in the datasets 120, while other transformers 132 fill-in blank entries in the datasets 120 (e.g., with a mean or median value from the remaining data points). Transformers 132 may also normalize entries within the datasets 120 that may be captured with different scales (e.g., one entry might be captured on a scale of 0-10,000 while another is captured on a scale of 0-1).

Each pipeline 130 within the pipeline execution device 104, therefore, has a unique combination of estimator 134 and transformers 132. ML pipeline one 130-1, for example, has three transformers 132: transformer 1 132-1, transformer 2 132-2, and transformer 3 132-3. ML pipeline one 130-1 also has estimator 1 134-1. ML pipeline n, on the other hand, has two transformers 132: transformer 1 132-1 and transformer 4 132-4; and uses estimator 2 134-2. Further pipelines 130 may include additional and/or alternative transformers 132, and many estimators 134 as well. Thus, one may readily perceive that the pipeline execution device 104 may include hundreds or thousands of pipelines 130, with each pipeline 130 having an unknown performance for a given dataset 120.

With so many pipelines 130 to sort through, the pipeline ranking environment 100 utilizes the meta learner device 102 as a step to efficiently determine optimal pipelines 130. An optimal pipeline 130 may be judged for performance in a variety of categories. For example, the pipelines 130 may be ranked based on a performance metric such as accuracy, error, recall, memory consumption, CPU usage, or running time, among others. The meta learner device 102 includes a meta learner program 140 that evaluates the pipelines 130 based on the meta features 122 that are extracted about the datasets 120, and historic data for performance by each pipeline 130 with related meta features 122. The meta features 122 include aspects of the datasets 120, rather than the actual data points within the datasets 120. For example, the meta features 122 may include categories such as: simple (e.g., the number of data points, classes, features, instances, missing values, outliers), statistical (e.g., data skewness, kurtosis, correlation, covariance, concentration, sparsity, gravity, the entropy of the targets, coefficient of variation, class probability), information-theoretic (e.g., class entropy, normal entropy, mutual information, uncertainty coefficient), complexity (e.g., Fisher's discrimination, volume of overlap, concept variation, data consistency), model-based (e.g., number of nodes, number of leaves, branch length, nodes per feature, leaves per class, leaves agreement, information gain), and landmarkers, among other things.

Once the meta features 122 have been extracted for a dataset 120, the meta learner program 140 is trained with the meta features 122 and the performance of a given pipeline 130 for a particular performance metric. The result of training the meta learner program 140, is that when the meta features 122 of new datasets 120 are fed through the meta learner program 140, the meta learner program 140 produces performance curves 142 for each new dataset 120. Performance curves include a level of performance (i.e., an ordinate of performance over a particular performance metric) for a number of data points that would be fed through the pipeline 130. Examples of performance curves 142 are illustrated in FIGS. 3 and 4.

Figure 2:
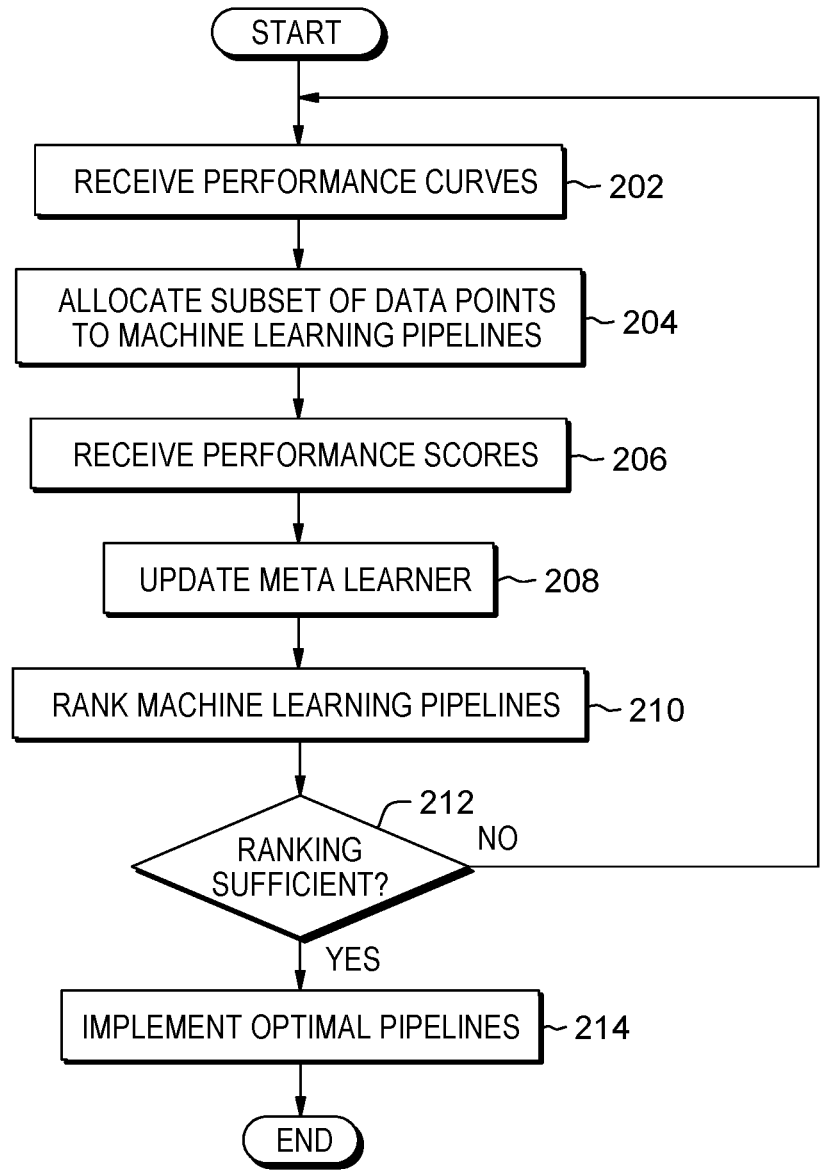
FIG. 2 is a flowchart depicting operational steps of a pipeline ranking program, in accordance with an embodiment of the present invention.

In addition to the performance curves 142, the pipeline ranking environment 100 includes a ranking device 106 that executes a pipeline ranking program 150 to dynamically update the ranking of the pipelines 130 for a given dataset 120. The pipeline ranking program 150 may execute a process that includes the steps of FIG. 2. The pipeline ranking program 150 may receive a performance curve 142 (block 202). The performance curve 142 may include information from multiple ML pipelines 130, and may be received from the meta learner device 102 over the network 110.

Figure 3:
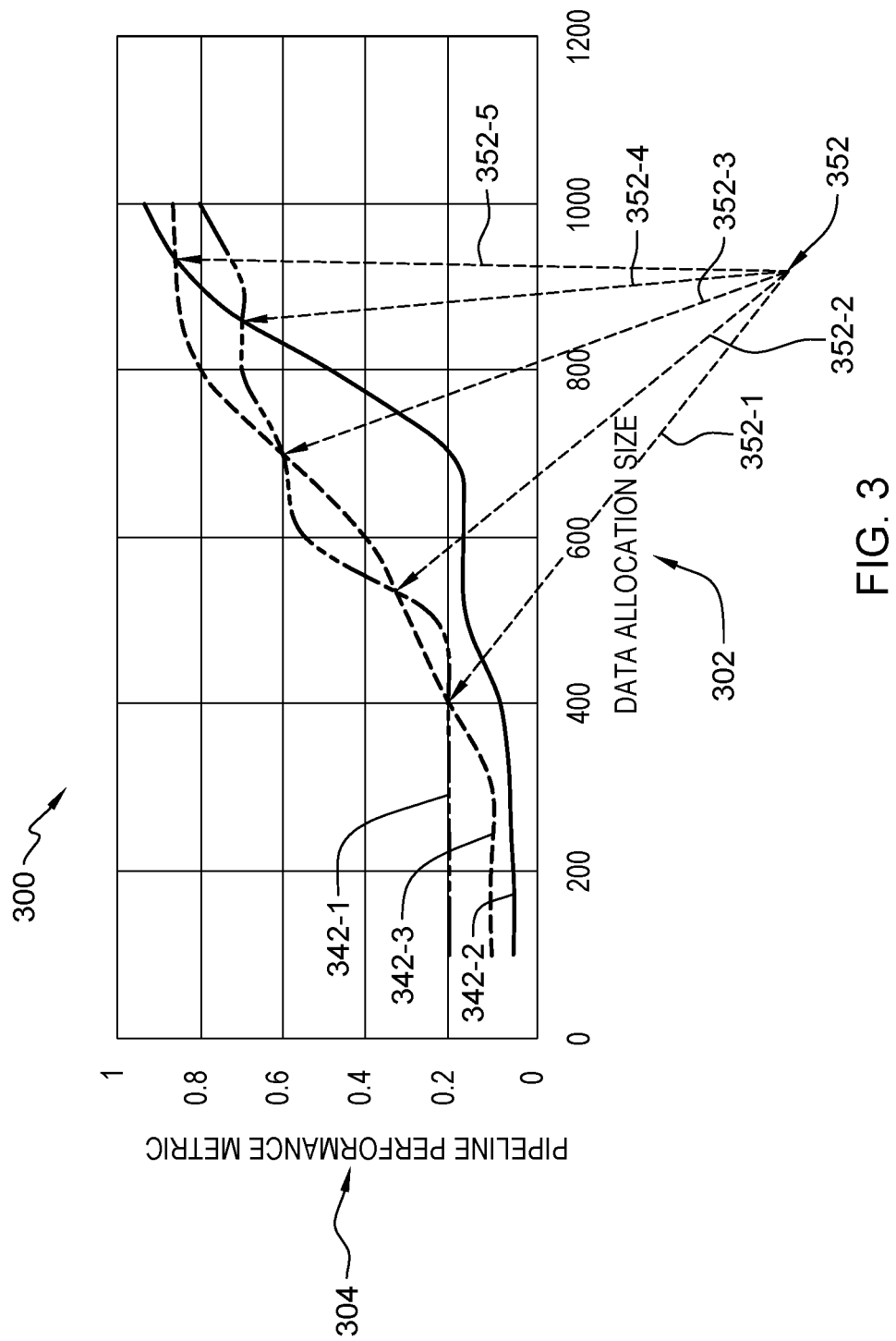
FIG. 3 is a graph depicting performance curves calculated by a meta learner program after training with pipeline meta features, in accordance with an embodiment of the present invention.
Figure 4:
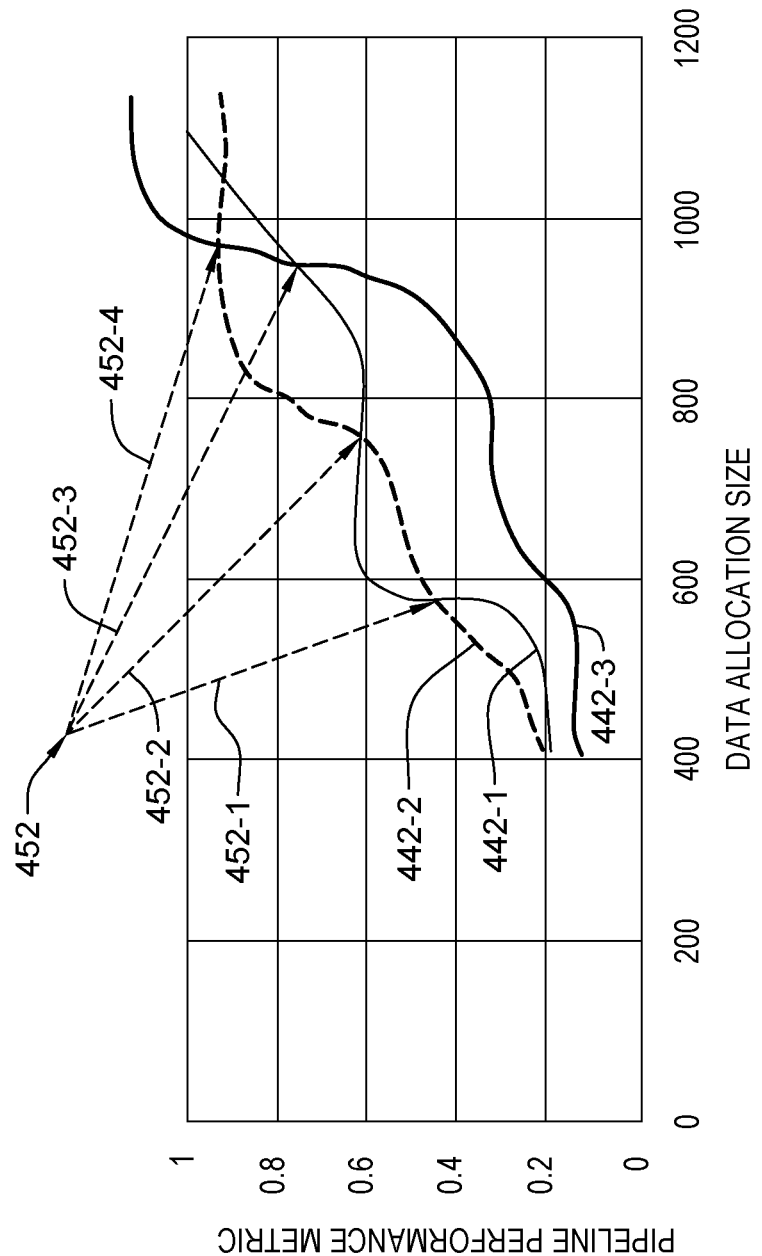
FIG. 4 is a graph depicting performance curves calculated by a meta learner program after training with performance metrics, in accordance with an embodiment of the present invention.

FIG. 3 is a graph 300 depicting performance curves 342 calculated by a meta learner program after training with pipeline meta features, in accordance with an embodiment of the present invention. The graph 300 includes an abscissa of data allocation size, meaning the number of data points 302 fed to each pipeline. The graph 300 also includes an ordinate of pipeline performance metric 304, meaning how well each pipeline performs at that number of data points. The illustrated embodiment of FIG. 3 includes a first performance curve 342-1 for a first pipeline, a second performance curve 342-2 for a second pipeline, and a third performance curve 342-3 for a third pipeline. The performance curves 342 received by the meta learner program are predictions: based on the meta features of the dataset, the meta learner program would expect the performance indicated in the graph 300.

Turning back to FIG. 2, the pipeline ranking program 150 allocates a subset of data points (i.e., from the dataset 120)

to the ML pipelines 130 (block 204). In certain embodiments, the pipeline ranking program 150 selects a "changing point" as the number of data points to allocate to the ML pipelines 130. A changing point is a number of data points at which the ranking of the pipelines 130 on the performance curve 142 changes. In FIG. 3, changing points 352 are labeled as points where the performance curves 342 cross. For example, a first changing point 352-1 (i.e., at 400 data points 302) shows the first performance curve 342-1 being overtaken by the second performance curve 342-2 as the pipeline with the highest performance projection. The first changing point 352-1 shows that the meta learner program indicates something critical might happen for the first pipeline (represented by the first performance curve 342-1) or the second pipeline (represented by the second performance curve 342-2). That is, allocating a number of data points less than 400 would likely not produce any results that are significantly different from results produced at 400 data points. Therefore, the meta learner program may determine that 400 datapoints would be a worthwhile subset of data points to allocate to the ML pipelines 130.

When the data points are allocated to the ML pipelines 130, the pipeline execution device 104 runs the data through each ML pipeline 130, and generates actual performance scores. The actual performance scores are received by the pipeline ranking program 150 (block 206). The pipeline ranking program 150 also updates the meta learner program 140 using the actual performance scores (block 208). Specifically, in certain embodiments, the difference between the predicted performance curve 142 and the actual performance metric is backpropagated through the model of the meta learner program 140 to complement the meta features 122 on which the meta learner program 140 produced the original performance curves 142. The updated meta learner program 140 then generates updated performance curves for the pipelines 130.

FIG. 4 is the graph 300 of FIG. 3 depicting updated performance curves 442, in accordance with an embodiment of the present invention. The meta learner program, after training with actual performance metrics, generated new values for a first updated performance curve 442-1, a second updated performance curve 442-2, and a third updated performance curve 442-3. The updated performance curves 442 demonstrate updated changing points 452, as well. For example, the first updated changing point 452-1 is located where the first updated performance curve 442-1 and the second updated performance curve 442-2 intersect at 575 data points. Before the update (i.e., for the performance curve 342 illustrated in FIG. 3) the second changing point 352-2 occurred at 550 data points, which indicates that the actual performance benefited the meta learner program and improved how the meta learner program models actual results.

Turning again to FIG. 2, the pipeline ranking program 150 ranks the ML pipelines 130 based on the updated performance curves 142 (block 210). The ranking may be based on the updated performance curves 142 projected to the full dataset 120, or may be based on the ranking of the updated performance curves 142 at a designated ranking data point. For example, in FIG. 4, the ranking of the pipelines may change depending on whether the ranking is measured at 500 data points (second pipeline; first pipeline; third pipeline), 650 data points (first pipeline; second pipeline; third pipeline), or 1000 data points (third pipeline; second pipeline; first pipeline). After the ranking, the pipeline ranking program 150 determines whether the ranking is sufficient (block 212). The ranking may be sufficient when further updating of the performance curves is likely to not provide any further benefit. For example, if the dataset 120 does not have any more data points, or there is a large discrepancy between optimal pipelines and suboptimal pipelines. If the ranking is insufficient (block 212 "No"), then the pipeline ranking program 150 repeats the process from receiving performance curves (i.e., from block 202). In certain embodiments, the pipeline ranking program 150 eliminates a number of pipelines 130 with each repetition of the process such that subsequent allocations of a subset of data points are given to fewer pipelines 130. If the ranking is sufficient (block 212 "Yes"), then the pipeline ranking program 150 implements the optimal pipelines 130 within a machine learning workflow (block 214). The optimal pipeline 130 is matched to a selected input dataset 120, and means that for that particular dataset 120, the optimal pipeline 130 will provide the best possible results.

Figure 5:
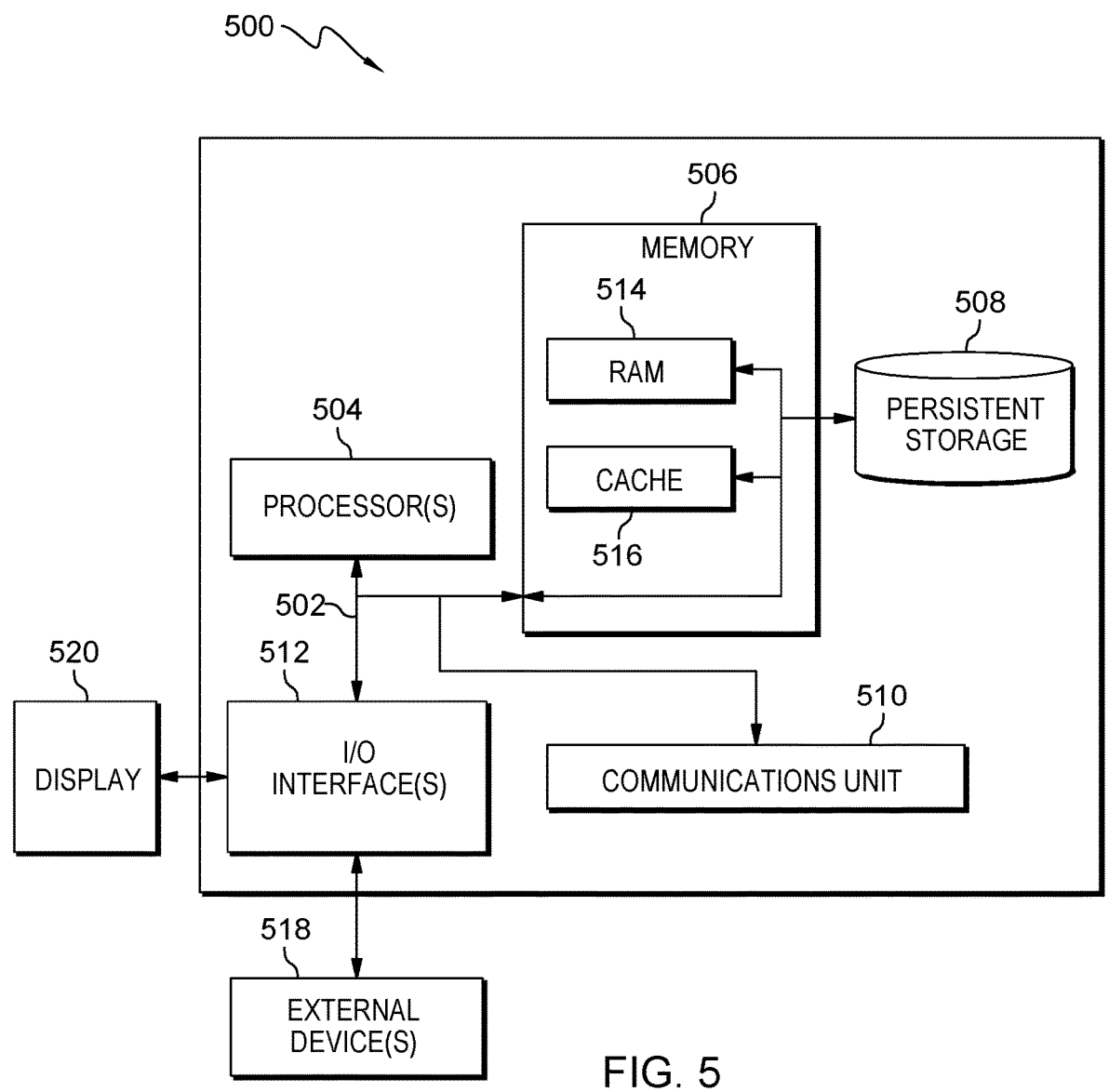
FIG. 5 is a block diagram of components of the computer executing the programs disclosed above, in accordance with embodiments of the present invention.

FIG. 5 depicts a block diagram of the computer components of the pipeline ranking environment in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

The meta learner device 102, the pipeline execution device 104, the ranking device 106, and the data storage device 108 may collectively or individually include communications fabric 502, which provides communications between RAM 514, cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

The pipelines, estimators, transformers, meta learner program, and/or pipeline ranking program may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. The pipelines, estimators, transformers, meta learner program, and/or pipeline ranking program may be downloaded to persistent storage 508 through communications unit 510.

I/O interface(s) 512 allows for input and output of data with other devices that may be connected to pipeline ranking environment 100. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention (e.g., pipelines, estimators, transformers, meta learner program, and/or pipeline ranking program) can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for ranking machine learning (ML) pipelines for a dataset, the method comprising:
    receiving, by one or more processors, first performance curves made up of performance values predicted for dependent variables of data allocation size, wherein the data allocation size comprises a number of data points fed to each of a plurality of machine learning (ML) pipelines by a meta learner model, wherein the first performance curves are the predicted performance values with respect to the dependent variables for each of the ML pipelines;
    allocating a first subset of data points from the dataset to each of the plurality of ML pipelines selected based on changing points where each changing point is a point where each of the first performance curves cross another of the first performance curves;
    receiving first performance scores for each of the ML pipelines for the first subset of data points;
    generating, by one or more processors, a new meta learner model by backpropagating a difference in the performance value between the first performance curves at a particular dependent variable value and the first performance scores for the first subset of data points at the particular dependent variable value;
    receiving second performance curves from the new meta learner model; and
    ranking the plurality of ML pipelines based on the second performance curves.

2. The method of claim 1, comprising training the meta learner model using meta features of a training dataset.

3. The method of claim 1, comprising allocating a second subset of data points from the dataset to each of the plurality of ML pipelines.

4. The method of claim 3, wherein the second subset of data points are selected based on the changing points.

5. The method of claim 1, wherein the meta learner model is updated via backpropagation of a difference between first performance curves and the first performance scores at each point in the first subset of data points.

6. The method of claim 1, wherein the first performance curves comprise scores for a selection from the group consisting of accuracy, error, recall, memory consumption, CPU usage, and running time, at a range of data points.

7. A computer program product for ranking machine learning (ML) pipelines for a dataset, comprising:
    one or more computer readable storage media, and program instructions collectively stored on the one or more computer readable storage media, the program instructions comprising:
        program instructions to receive first performance curves made up of performance values predicted for dependent variables of data allocation size, wherein the data allocation size comprises a number of data points fed to each of a plurality of machine learning (ML) pipelines by a meta learner model, wherein the first performance curves are the predicted performance values with respect to the dependent variables for each of the ML pipelines;
        program instructions to allocate a first subset of data points from a dataset to each of the plurality of ML pipelines selected based on changing points where the each changing point is a point where each of the first performance curves cross another of the first performance curves;
        program instructions to receive first performance scores for each of the ML pipelines for the first subset of data points;
        program instructions to generate a new meta learner model by backpropagating a difference in the performance value between the first performance curves at a particular dependent variable value and the first performance scores for the data first subset of data points at the particular dependent variable value;
        program instructions to receive second performance curves from the new meta learner model; and
        program instructions to rank the plurality of ML pipelines based on the second performance curves.

8. The computer program product of claim 7, comprising program instructions to train the meta learner model using meta features of a training dataset.

9. The computer program product of claim 7, comprising program instructions to allocate a second subset of data points from the dataset to each of the plurality of ML pipelines.

10. The computer program product of claim 9, wherein the second subset of data points are selected based on changing points where the first performance curves cross.

11. The computer program product of claim 7, wherein the meta learner model is updated via backpropagation of a difference between first performance curves and the first performance scores at each point in the first subset of data points.

12. The computer program product of claim 7, wherein the first performance curves comprise scores for a selection from the group consisting of accuracy, error, recall, memory consumption, CPU usage, and running time.

13. A computer system comprising:
one or more computer processors, one or more computer readable storage media, and program instructions collectively stored on the one or more computer readable storage media for execution by at least one of the one or more computer processors, the program instructions comprising:
program instructions to receive first performance curves made up of performance values predicted for dependent variables of data allocation size, wherein the data allocation size comprises a number of data points fed to each of a plurality of machine learning (ML) pipelines by a meta learner model, wherein the first performance curves are the predicted performance values with respect to the dependent variables for each of the ML pipelines;
program instructions to allocate a first subset of data points from a dataset to each of the plurality of ML pipelines selected based on changing points where each changing point is a point where each of the first performance curves cross another of the first performance curves;
program instructions to receive first performance scores for each of the ML pipelines for the first subset of data points;
program instructions to generate a new meta learner model by backpropagating a difference in the performance value between the first performance curves at a particular dependent variable value and the first performance scores for the first subset of data points at the particular dependent variable value;
program instructions to receive second performance curves from the new meta learner model; and
program instructions to rank the plurality of ML pipelines based on the second performance curves.

14. The system of claim 13, comprising program instructions to train the meta learner model using meta features of a training dataset.

15. The system of claim 13, comprising program instructions to allocate a second subset of data points from the dataset to each of the plurality of ML pipelines.

16. The system of claim 15, wherein the second subset of data points are selected based on the changing points where the first performance curves cross.

17. The system of claim 13, wherein the meta learner model is updated via backpropagation of a difference between first performance curves and the first performance scores at each point in the first subset of data points.

18. The system of claim 13, wherein the first performance curves comprise scores for performance values selected from the group consisting of accuracy, error, recall, memory consumption, CPU usage, and running time.

* * * * *